Figure 1:
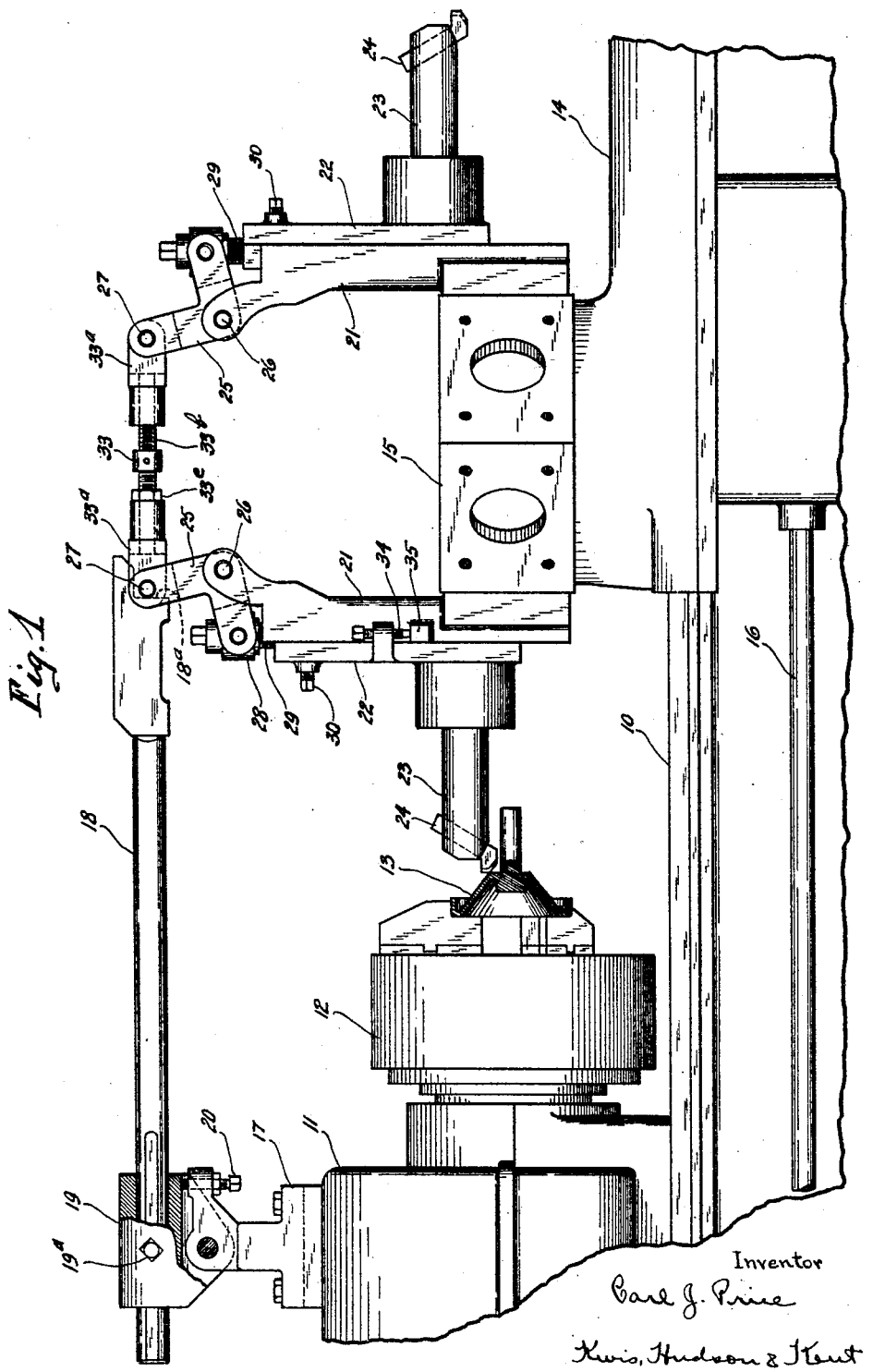

Feb. 24, 1931.   C. J. PRICE   1,793,718
TOOL CONTROLLING MECHANISM
Filed May 31, 1928   2 Sheets-Sheet 1

Inventor
Carl J. Price
Kwis, Hudson & Kent
Attorneys

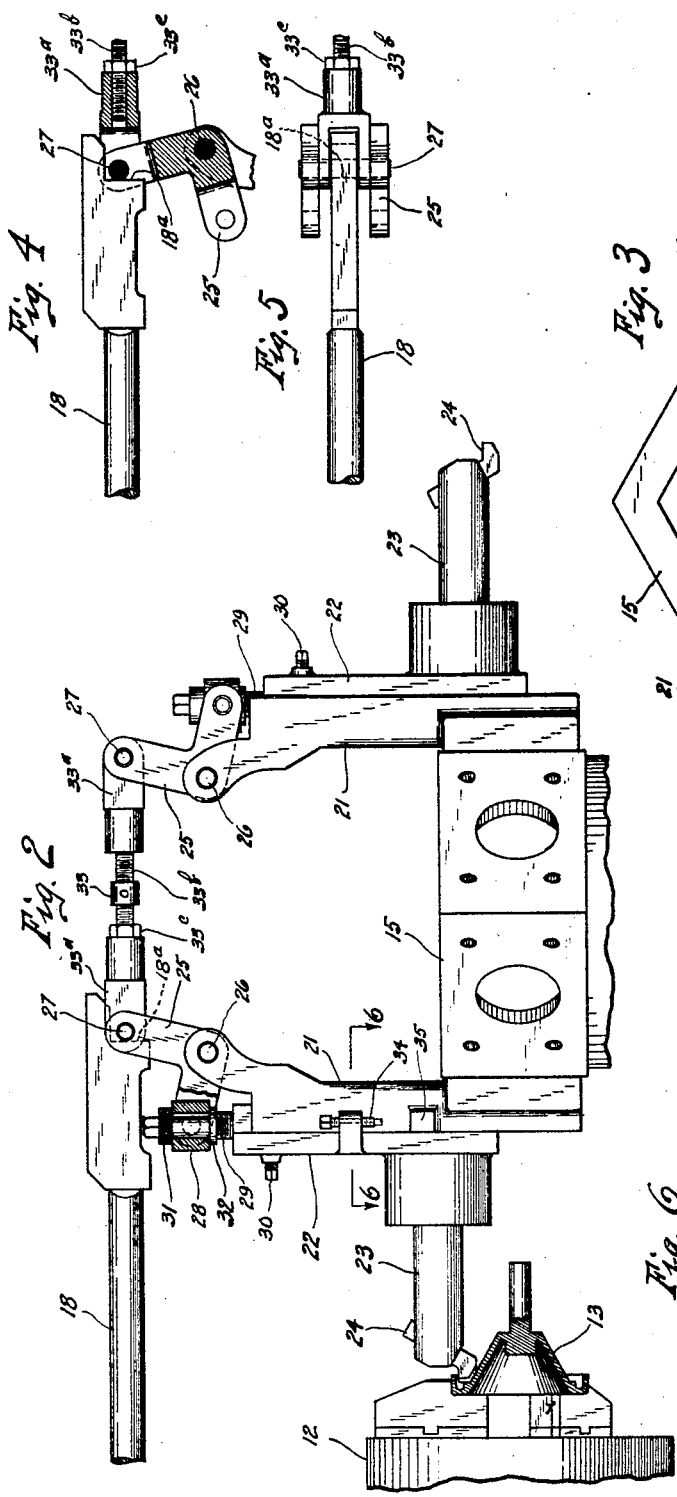

Patented Feb. 24, 1931

1,793,718

UNITED STATES PATENT OFFICE

CARL J. PRICE, OF CLEVELAND, OHIO, ASSIGNOR TO THE WARNER & SWASEY COMPANY, OF CLEVELAND, OHIO, A CORPORATION OF OHIO

TOOL-CONTROLLING MECHANISM

Application filed May 31, 1928. Serial No. 281,632.

This invention relates to machine tools, particularly those of the type having two or more tool holding units adapted to be successively brought into operation on the same or different work pieces.

The principal object of the invention is to effect certain economies of operation which will increase production by reducing the time now required between operations on the same or different work pieces.

More specifically considered, it is one of the objects to reduce the time now consumed in positioning the tool for cutting or operating on the work piece just prior to the time that the tool holding unit, of which the tool is a part, is put into operation.

In carrying out the invention the above objects are obtained by a connection between the tool holding units such that during the operation of one unit the tool of another unit is automatically brought to a predetermined position for the next operation. For example, if it be assumed that while one unit is in operation its tool is moving either outwardly or inwardly with reference to the axis of the work piece, this connection between the units causes the tool of another unit to be moved in the opposite direction to that of the unit in operation so that when the unit in operation has completed its work the tool of the next unit to be put into operation is in position for the performance of its work except for the necessary indexing of the main tool holder and the forward movement of the slide.

The features of construction or arrangement for the attainment of the objects referred to above may be embodied in specifically different types of tools or with tool holding units of different kinds but in the drawings I have illustrated the invention applied to a machine for cutting tapered surfaces and of the general type illustrated and claimed in a prior application Serial No. 245,220 filed January 7th, 1928, in the names of J. L. Bayer and John J. N. Van Hamersveld.

In the drawings—Fig. 1 is a side elevation of a lathe of the turret type adapted for cutting tapered surfaces, this view illustrating portions of the bed, head and turret slide, enough of these parts being shown to illustrate the application and mode of operation of the present invention; Fig. 2 is a view similar to Fig. 1 showing portions only of the lathe but illustrating the parts directly involved in the present invention in different positions than illustrated in Fig. 1; Fig. 3 is a top plan view showing a tool holder, in this instance in the form of a turret, and two tool holder units applied thereto; Fig. 4 is a fragmentary view showing in side elevation an abutment which shifts the tools of the tool holding units and showing also a portion of one of the parts which cooperates therewith; Fig. 5 is a plan view of the same; and Fig. 6 is a transverse section along the line 6—6 of Fig. 2.

Referring now to the drawings, 10 represents the bed of the lathe which is provided with a head 11 having the usual work spindle which in this instance is provided with a rotary chuck 12 for gripping work pieces, one of which is illustrated at 13. On the bed 10 is a turret slide 14 provided with a rotary turret 15 which may be indexed manually or automatically to position different tool holding units for operating on work pieces, the slide 14 being movable toward and from the head and chuck 14 and being generally moved by power, the power driven shaft for this purpose being illustrated at 16. The parts so far described may be portions of a standard lathe the details of which do not concern the present invention and need not be illustrated or described.

The parts more directly constituting the present invention are in this instance in the form of an attachment, a part of which is applied to the head 11 and other parts to the turret 15. The part which is attached to the head 11 includes a bracket 17 which is bolted or otherwise secured to the top front portion of the head. This bracket carries an abutment 18 which normally extends substantially horizontally from the head toward the turret. In this instance the abutment 18 is adjustably secured in a holder 19 which in turn is pivoted to the bracket 17 so that it may be swung to inoperative vertical position. The upper front portion of the bracket is provided in this instance with a set screw 20 which supports the abutment in its horizontal or substantially horizontal position. Obviously, by adjusting this screw the position of the forward end of the abutment may be varied either raised or lowered as circumstances may require. The abutment 18 is adapted to be secured in the holder 19 by one or more clamping set screws 19a or otherwise.

The portion of the attachment which is mounted on the turret 15 includes two tool holding brackets 21, 21 which are secured in this instance to opposite faces of the turret, although it is not essential that the faces to which the brackets 21, 21 are secured be oppositely disposed. Each bracket carries a slide 22 which in this instance has a dove-tail sliding connection with the face of the bracket and is adapted to be moved inwardly and outwardly at right angles to the axis of rotation of the work piece 13. Each of these slides is provided with a tool holding member 23 in which is secured in any suitable manner a tool 24.

As previously stated I have shown my invention applied to a machine of the general type constituting the subject matter of the said prior application or for cutting tapered surfaces on work pieces. Accordingly, as the slide 22 moved outwardly by the action of the abutment 18 on the parts to be referred to, the cutting point of the tool will move outwardly so that the tool will have a combined forward and outward movement and give the tapered surface to the work piece.

When the tool 24 reaches the position shown in Fig. 1 in the forward travel of the turret, i. e., when the tool reaches the position where the cutting operation begins the forward end of the abutment 18 (which it will be understood is held in fixed position while it is functioning) comes into action by engaging a part which is connected to the slide so as to give the slide in this instance an outward movement as the forward travel of the turret continues until the tool completes the cutting of the tapered surface, in which event it is the position shown in Fig. 2. To bring about this outward movement of the slide during the cutting operation, as just explained, I provide, as in said prior application referred to, slide shifting means in the form of a bell crank 25, one of these bell cranks, being pivotally mounted by means of a pin 26 on the upper end of each of the brackets 21. These bell cranks, as herein illustrated, have forked upwardly extending arms through which extend pins 27 which are adapted to engage a shoulder 18a at the forward end of the abutment 18. The bell cranks also have forked inner or lower arms which are adjustably connected to the slides so that the rocking movement imparted to the bell cranks by the abutment 18 will cause a sliding movement to be imparted to the slides 22. In this instance these bell crank arms last referred to have pin connections with sleeves 28 which rather loosely surround the upper portions of screws 29 (see Fig. 2), which screws have threaded engagement with the slides and constitute longitudinal extensions of the slides. The screws 29 can be held in any desired position of adjustment by set screws 30. The sleeves 28 are held between abutments 31 and 32 of the screws (see Fig. 2) and the slight lost motion or play between the sleeves and screws prevents any binding action between the bell cranks and screws as the lower arms of the bell crank rock back and forth past the center position.

It will be seen from the above that when the tool 24 is at the beginning of its cut the slide 22 is in its innermost position and at the completion of the cut shown in Fig. 2 it is in its outermost position. Heretofore the lowering of the slide to a position such that the tool is restored to cutting position for the next cutting operation has required time and labor. In the said prior application the abutment has a more or less positive connection with the forked outer end of the bell crank so that when the turret slide is retracted following the completion of the cut the slide 22 is moved inwardly by the action of the abutment on the bell crank, but first it was necessary for the operator to manually relieve the tool from the work piece so that the latter would not be scored by the tool while the turret slide was being retracted and the slide 22 was moving inwardly. The retracting of the turret slide had to be done very carefully by hand so as to stop the retracting movement when the tool was restored to cutting position. Then, it was necessary for the operator to disengage the abutment from the bell crank by swinging the abutment upwardly, then the retracting movement of the turret slide would be continued either by power or by hand until the tool was sufficiently free from the work piece to permit the work to be replaced by a new work piece or to bring other tools into working position. Following this it was necessary that the turret again be moved forwardly until the tool was in cutting position with reference to the work piece and then the abutment would again be lowered to connect it with the upper end of the bell crank. These operations which required considerable time materially affected the production of the machine.

These disadvantages are overcome by the present invention which as heretofore stated in this instance involves the introduction between the cutting units of a connection which serves to restore the slide and tool of one cutting unit to cutting position while the other cutting unit is operating. In the embodiment illustrated this connection is in the form of an adjustable link 33 connecting the upper ends of the bell cranks. This link as herein shown comprises two forks 33a and an adjustable turnbuckle 33b between them, this turnbuckle having right and left-hand threaded portions engaging the forks so that by turning the turnbuckle the forks will be moved toward or away from each other so as to adjust the length of the link. When the turnbuckle has been turned to give the link 33 a desired length it may be locked in position by a lock nut 33c or any equivalent locking means. The two forks fit inside the forked upper ends of the bell cranks and are pivotally connected to the pins 27. As illustrated in Fig. 5, the shoulder 18a of the abutment 18 is adapted to engage the pins 27 between the arms of the forks 33a.

It will be obvious from the above that the connection between the bell cranks 25 of the two cutting units causes the slides 22 to be simultaneously moved in opposite directions; that is to say, during one cutting operation when the bell crank 25 of one cutting unit is being rocked by the abutment 18 so as to move the associated slide 22 outwardly, the movement transmitted through the link connection to the bell crank of the other cutting unit causes its slide to be moved inwardly. Accordingly, when the tool of one cutting unit completes its cut and its slide 22 is in its outermost position, as indicated in Fig. 2, the slide 22 of the other cutting unit is in its lowermost position with its cutting tool at the right height for the beginning of the next cutting operation. Accordingly, it is only necessary to retract the turret and then index the turret to bring the other cutting unit opposite the work holder and then to advance the turret to start the next cutting operation.

These operations can be done relatively quickly especially since the bell cranks of the cutting units are clear of the abutment as soon as the retracting movement starts, and the turret slide can be retracted and later advanced with a quick motion, since it is unnecessary to engage and disengage the cutting units and the abutment. Likewise it is unnecessary to manually relieve the tool from the work piece as heretofore.

A positive stop is preferably provided as a limit for the inward movement of the slide 22 through the action of the link 33 to prevent accidental movement by vibration or while indexing the turret. This positive stop as herein illustrated comprises an adjustable set screw 34 carried by the slide 22 and adapted to engage a lug 35 on the bracket 21, it being understood that a similar stop is provided on each cutting unit as indicated in Fig. 3. The length of the link is so selected that the set screw 34 of the idle cutting unit will engage the lug 35 just at the completion of the cut or when the forward movement of the turret slide is stopped to terminate the cutting operation.

Thus it will be seen that the advantages heretofore enumerated are obtained by reason of the fact that one cutting unit is restored to cutting position (except for the movements which are to be imparted to the turret) while the other cutting unit is in operation, this resulting in greatly increased production.

While I have shown one form of connection between cutting units, which are in this instance supported on oppositely disposed faces of the turret permitting the use of a connection formed by a link, I wish to be understood that the connection may be differently formed and may include other mechanical elements, such as gears and levers, depending upon the relative arrangement of the cutting units and also upon the form or construction of the cutting units as well as the specific cutting operations to be performed. That is to say, I consider it within the scope of my invention to connect other types or forms of cutting units for the purposes herein explained, the connection assuming the mechanical form best adapted for the form and arrangement of the cutting units.

I, therefore, aim in my claims to cover all modifications which do not involve a departure from the spirit and scope of the invention.

Having thus described my invention, what I claim is:

1. In a machine tool, a work holder, a plurality of units having movable tools which operate in different cycles, and means whereby the movement of the tool of one unit during its working operation in one cycle causes the tool of another unit to be brought to a predetermined position for operation in a following cycle.

2. In a machine tool, a plurality of tool holding units having movable tools, and means whereby the operation of one unit changes the position of the tool of another unit to restore it to its operative position for the start of its cutting operation.

3. In a machine tool, a work holder, a plurality of tool holding units having movable tools, and means including a movement transmitting connection between the units to restore the tool of one unit to its operative position for the start of its cutting operation while the tool of the other unit is operating.

4. In a machine tool, a plurality of cutting units having tools movable inwardly and outwardly, and means including connections between the units for causing the tools of the two units to be simultaneously moved in opposite directions, one unit being restored to its operative position for the start of its cutting operation while the other unit is operating.

5. In a machine tool, a work holder, a tool holder, one movable relative to the other, a pair of cutting units carried by the tool holder one idle while the other is in operation, and means including a connection between the units for causing the tool of the idle unit to be restored to cutting position by the operation of the working unit.

6. In a machine tool of the type having a bed, a head and a slide movable toward and from the head, a pair of tool holding units mounted on the slide and adapted to be successively brought into operation, and means including a movement transmitting connection between the units by which the operation of one unit causes the tool of the other unit to be restored to predetermined position for the next operation.

7. In a machine tool comprising a bed, a head, a turret slide movable toward and from the head and having an indexible turret, a pair of tool holding units mounted on different faces of the turret and provided with tools movable laterally of the axis of the machine, and a movement transmitting connection between the units by which the operation of one unit restores the tool of another unit to a predetermined position for the next operation.

8. A machine tool comprising a work holder, a tool holder movable toward and from each other, a pair of tool carrying units mounted on the tool holder and comprising slides movable laterally of the axis of the machine, and means comprising a connection between the units and a normally stationary abutment engageable by a part of one of the units during said relative movement between the work holder and the tool holder for moving one slide outwardly and the other inwardly.

9. A machine tool comprising a work holder and a tool holder one movable toward and from the other, a pair of tool carrying units mounted on the tool holder and comprising tool supporting members movable laterally of the axis of the machine and inter-connected, and means comprising a normally stationary abutment engageable by a part of one unit for moving one of said tool supporting members outwardly and the other inwardly.

10. A machine tool comprising a work holder, a tool holding slide movable toward and from the work holder, a pair of cutting units mounted on the slide and adapted to be successively positioned for cutting, said units comprising tool supporting slides movable inwardly and outwardly, actuating members connected thereto and inter-connected, and a normally stationary abutment engageable by a part of one of the units so as to move the actuating members and simultaneously move one tool supporting slide outwardly and the other inwardly.

In testimony whereof, I hereunto affix my signature.

CARL J. PRICE.